United States Patent
Shiraishi et al.

(10) Patent No.: US 7,729,568 B2
(45) Date of Patent: Jun. 1, 2010

(54) OPTICAL DEVICE HAVING STRESS LAYER INDUCING REFRACTION INDEX VARIATION IN A PARTIAL REGION OF A SUBSTRATE BY PHOTOELASTIC EFFECT

(75) Inventors: Takashi Shiraishi, Kawasaki (JP); Kazuhiro Tanaka, Kawasaki (JP); Tetsuya Miyatake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/187,606

(22) Filed: Aug. 7, 2008

(65) Prior Publication Data

US 2008/0292258 A1 Nov. 27, 2008

Related U.S. Application Data

(63) Continuation of application No. PCT/JP2006/302651, filed on Feb. 15, 2006.

(51) Int. Cl.
*G02B 6/00* (2006.01)
*G02B 6/10* (2006.01)

(52) U.S. Cl. .................... 385/13; 385/129; 385/130; 385/131; 385/132

(58) Field of Classification Search .............. 356/32, 356/33; 73/800; 385/13, 129–132
See application file for complete search history.

(56) References Cited

U.S. PATENT DOCUMENTS

| 4,733,927 | A | * | 3/1988 | Jackson et al. | 385/129 |
| 4,781,424 | A | * | 11/1988 | Kawachi et al. | 385/132 |
| 5,561,301 | A | * | 10/1996 | Inoue | 257/13 |
| 5,748,358 | A | * | 5/1998 | Sugamata et al. | 359/245 |
| 6,847,772 | B2 | * | 1/2005 | Inoue et al. | 385/129 |
| 2006/0211221 | A1 | * | 9/2006 | Mantl et al. | 438/475 |

FOREIGN PATENT DOCUMENTS

| JP | 2-5028 | 1/1990 |
| JP | 5-34525 | 2/1993 |
| JP | 6-53312 | 2/1994 |
| JP | 2003-248130 | 9/2003 |

OTHER PUBLICATIONS

K. Saitoh, et al., "Stress Analysis Method for Elastically Anisotropic Material Based Optical Waveguides and its Application to Strain-Induced Optical Waveguides", Journal of Lightwave Technology, vol. 17, No. 2, pp. 255-259, Feb. 1999.

O. Eknoyan, et al., "Strain Induced Optical Waveguides in Lithium Niobate, Lithium Tantalate, and Barium Titanate", Appl. Phys. Lett. 60 (4), pp. 407-409, Jan. 27, 1992.

International Search Report mailed May 16, 2006 for International Application No. PCT/JP2006/302651.

* cited by examiner

*Primary Examiner*—Frank G Font
*Assistant Examiner*—Erin D Chiem
(74) *Attorney, Agent, or Firm*—Staas & Halsey LLP (57) ABSTRACT

The application relates to an optical device for enhancing the stress to be generated in a substrate in comparison with a conventional technique. To this end, the optical device includes a substrate having a photoelastic effect, a first stress layer formed on a first face of the substrate and having a pattern for generating stress which induces refraction index variation by the photoelastic effect in a partial region in the substrate, and a second stress layer formed on a second face which is a reverse face to the first face of the substrate and configured to generate stress for restoring the shape from the deformation caused by the stress generated in the substrate by the first stress layer in the substrate.

8 Claims, 9 Drawing Sheets

SUBSTRATE MATERIAL

| | r (pm/V) ELECTRO-OPTICAL COEFFICIENT | p PHOTO-ELASTIC COEFFICIENT | α THERMAL EXPANSION COEFFICIENT (1/°C) |
|---|---|---|---|
| LiNbO$_3$ | 31 | + | $15 \times 10^{-6}$ |
| BNN | 59 | | |
| BSTN | 218 | + | $10 \times 10^{-6}$ |
| SBN | 1340 | + | $10 \times 10^{-6}$ |
| BULK PLZT | 600 | | |
| EPI PLZT | 50 | | |
| GaAs | 1.5 | − | $6.9 \times 10^{-6}$ |

FIG. 5

EXAMPLE OF STRESS FILM MATERIAL

| | $\alpha$ THERMAL EXPANSION COEFFICIENT (1/°C) | |
|---|---|---|
| SiO² | $0.55 \times 10^{-6}$ | USE MAINLY WHEN ρ IS + |
| SiN | $2.5 \times 10^{-6}$ | USE MAINLY WHEN ρ IS + |
| Al | $27 \times 10^{-6}$ | USE MAINLY WHEN ρ IS − |
| POLYIMIDE | $50 \times 10^{-6}$ | USE MAINLY WHEN ρ IS − |

|  | r(pm/V) ELECTRO-OPTICAL COEFFICIENT |
|---|---|
| $LiNbO_3$ | 31 |
| BNN | 59 |
| BSTN | 218 |
| SBN | 1340 |
| BULK PLZT | 600 |
| EPI PLZT | 50 |
| GaAs | 1.5 |

FIG. 9

OPTICAL DEVICE HAVING STRESS LAYER INDUCING REFRACTION INDEX VARIATION IN A PARTIAL REGION OF A SUBSTRATE BY PHOTOELASTIC EFFECT

This application is a continuation application, filed under 35 USC 111(a), of International Application PCT/JP2006/302651, filed Feb. 15, 2006.

BACKGROUND OF THE INVENTION

1) Field of the Invention

The present application relates to an optical device, and particularly to an optical device suitable for use in technical fields of optical communication, optical signal processing and so forth.

2) Description of the Related Art

It is known that, if an electric field is applied to dielectric crystal or ferroelectric crystal, then the refraction index thereof varies by an electro-optical effect. Conventionally, various optical devices such as an optical modulator, an optical deflection device, an optical switch and so forth have been developed making use of the effect just described. Here, are fraction index variation $\Delta n$ by the electro-optical effect is represented by an expression (1) given below.

$$\Delta n = -\frac{1}{2}n^3 rE \qquad (1)$$

where n is the refraction index of the ferroelectric substance, E the applied voltage, and r the electro-optical coefficient. Where an optical modulator is taken as an example, $LiNbO_3$ is used frequently as a material. The electro-optical coefficient of $LiNbO_3$ is 30 pm/V, which is not a very high value in comparison with those of other electro-optical materials. SBN ($Sr_{0.75}Ba_{0.25}Nb_2O_6$), PLZT ($Pb_{1-x}La_x(Zr_yTi_{1-y})_{1-x/4}O_3$) and so forth are known as a ferroelectric material having a relatively high electro-optical coefficient.

Figure 8:
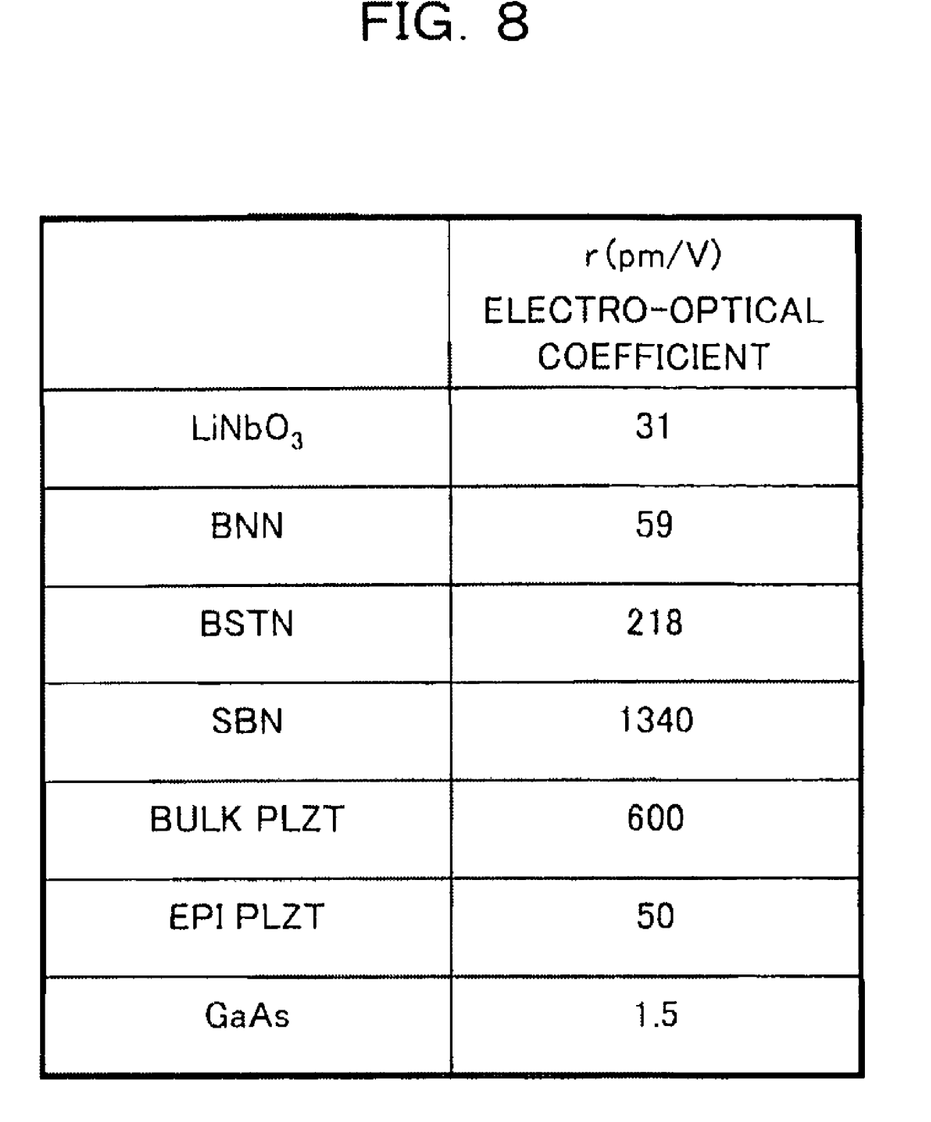
FIG. 8 is a view illustrating a relationship between representative dielectric substances and electro-optical coefficients.

A relationship between representative dielectric materials and electro-optical coefficients is illustrated in FIG. 8. It is to be noted that, in FIG. 8, BNN is $Ba_2NaNbO_5$, and BSTN is $Ba_{1-x}Sr_xTi_yNb_{2-y}O_6$. If an optical waveguide is formed from a material having a higher electro-optical coefficient, then a low-voltage optical device can be formed and reduction of power consumption as an optical device can be expected.

Here, where an optical device is formed from a material having such a high electro-optical effect as described above such as SBN, formation of an optical waveguide is a significant subject. In particular, while it is known that, where $LiNbO_3$ is used, a low-loss optical waveguide can be formed by thermally diffusing a metal such as Ti, where a material such as SBN, PLZT or the like is used, it is hard to diffuse a metal. Therefore, in the method just described, the propagation loss increases and it is not easy to form a low-loss optical waveguide.

On the other hand, as an optical waveguide forming method, a stress-applied type waveguide is disclosed in O. Eknoyan. et al. "Strain induced optical waveguides in lithium niobate, lithium tantalite, and barium titanate", Appl. Phys. Lett., vol 60, No. 4, 27 Jan. 1992, pp 407-409 (hereinafter referred to as Non-Patent Document 1). The waveguide disclosed in Non-Patent Document 1 is formed in the following manner. First, a stress film whose thermal expansion coefficient is different from that of a ferroelectric substrate which has a photoelastic effect is deposited on the substrate at a high temperature. At this time, stress is generated uniformly in the substrate by the difference between the thermal expansion coefficients of the substrate and the stress film. Then, when the stress film is patterned by etching, stress is generated at edges of the stress film thereby to apply distortion to the substrate. The refraction index is varied by the photoelastic effect of the ferroelectric substance thereby to form an optical waveguide.

Figure 9:
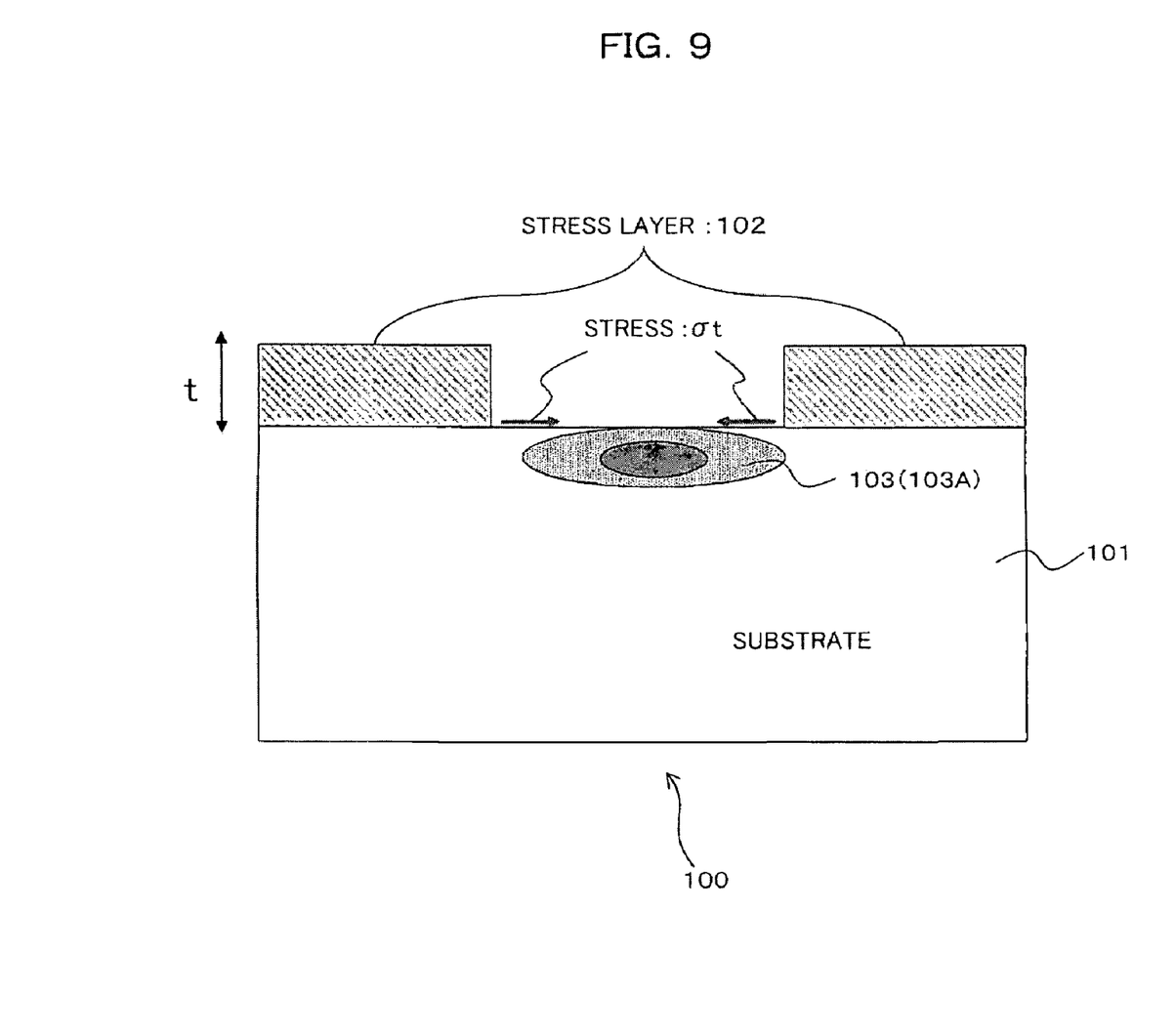
FIG. 9 is a view of a conventional optical device.

In particular, Non-Patent Document 1 mentioned above discloses such an optical device 100 as shown in FIG. 9, wherein a stress layer 102 patterned as a film is formed on a substrate 101. In the optical device 100, distortion is generated in a region 103 between different portions of the stress layer 102 of the substrate 101 by stress at generated at edges of the stress layer 102. Then, since the refraction index of the region 103 in which the distortion is generated varies by the photoelastic effect, the region 103 can be formed as an optical waveguide (stress optical waveguide) 103A by the photoelastic effect.

Further, as a known technique relating to the present application, techniques disclosed in Patent Documents 1 to 3 are available. In Japanese Patent Laid-Open No. Hei 2-5028 thereinafter referred to as Patent Document 1), an Au pattern for stress application is disclosed. In Japanese Patent Laid-Open No. 2003-248130 (hereinafter referred to as Patent Document 2), a technique wherein an intermediate layer for moderating distortion by a thermal expansion coefficient difference between a core layer and a cladding layer, which form an optical waveguide layer, and a substrate is disclosed. Further, in Japanese Patent Laid-Open No. Hei 6-53312 (hereinafter referred to as Patent Document 3), a technique wherein a stress applying film is formed on both faces of a silicon substrate in order to cancel tension and contraction of a device separation pattern.

SUMMARY OF THE INVENTION

In the stress application type waveguide disclosed in Non-Patent Document 1 described hereinabove, impurity is not applied as in the case of diffusion. Therefore, if the waveguide is transparent, then propagation loss decreases without depending upon the crystal structure. But it is difficult to enhance stress to be applied to the substrate 101. In particular, in the configuration of the stress film 102 described above with reference to FIG. 9, there is a subject that it is difficult to apply stress necessary for forming a (High-$\Delta$) optical waveguide having a refraction index difference sufficient to confine propagation light to the substrate 101.

For example, it seems a possible countermeasure to increase the thickness t of the stress layer 102 or to set the deposition temperature of the stress layer 102 higher so that the stress to be applied to the substrate 101 is enhanced. However, if the thickness t of the stress layer 102 is increased, then since the stress layer 102 itself becomes likely to be exfoliated from the substrate 101, it is difficult to secure the stability of the configuration as an optical device. Further, if the deposition temperature of the stress layer 102 is set higher, then the stress to be applied increases as the set deposition temperature rises. However, at a deposition temperature for securing the stability of the configuration as an optical device, it is difficult to apply sufficient stress to the substrate.

In such a waveguide whose performance for confining light is low as described above, since the mode field of light is increased, also the coupling loss with an optical fiber at input and output ends increases. Further, this gives rise to a subject also that, if it is tried to utilize the electro-optical effect, the application efficiency of an electric field decreases.

Therefore, it is an object of the present application to provide an optical device which can increase the stress to be generated in a substrate in comparison with the conventional technique.

Further, it is another object of the present application to provide an optical device which can achieve decrease of the loss of a stress-applied optical waveguide for which a photoelastic effect is utilized.

In order to attain the objects described above, according to the present application, there is provided an optical device comprising a substrate having a photoelastic effect, a first stress layer formed on a first face of the substrate and having a pattern for generating stress which induces refraction index variation by the photoelastic effect in a partial region in the substrate, and a second stress layer formed on a second face which is a reverse face to the first face of the substrate and configured to enhance the stress which induces the refraction index variation in the partial region.

Preferably, in the partial region, the refraction index variation is induced so that the refraction index therein is higher than that in the other regions in the substrate. Further, the partial region can be configured as an optical waveguide.

Further, the substrate may be configured from a material whose photoelastic coefficient has a positive value, and the first and second stress layers may be configured such that tensile stress is generated in the substrate. In this case, the first and second stress layers are configured from a material whose thermal expansion coefficient is lower than that of the substrate.

Further, the substrate may be configured from a material whose photoelastic coefficient has a negative value, and the first and second stress layers may be configured such that compressive stress is generated in the substrate. In this case, the first and second stress layers are configured from a material whose thermal expansion coefficient is higher than that of the substrate.

Further, the substrate may be configured from a ferroelectric substance having an electro-optical effect.

Preferably, a magnitude relationship between a thermal expansion coefficient of the first stress layer and a thermal expansion coefficient of the substrate and another magnitude relationship between a thermal expansion coefficient of the second stress layer and the thermal expansion coefficient of the substrate are the same magnitude relationship.

With the optical device, an advantage that refraction index variation in the partial region of the substrate can be increased can be achieved.

The above and other objects, features and advantages of the present application will become apparent from the following description and the appended claims, taken in conjunction with the accompanying drawings in which like parts or elements are denoted by like reference characters.

DESCRIPTION OF THE PREFERRED EMBODIMENT

In the following, an embodiment of the present application is described with reference to the drawings. It is to be noted that the present application is not restricted to the embodiment described below. Further, not only the objects of the present application described above but also other technical subjects, means for solving the technical subjects and operation/working-effects become apparent from the following disclosure of the embodiments of the present application.

[a] Description of an Embodiment of the Present Application

Figure 1:
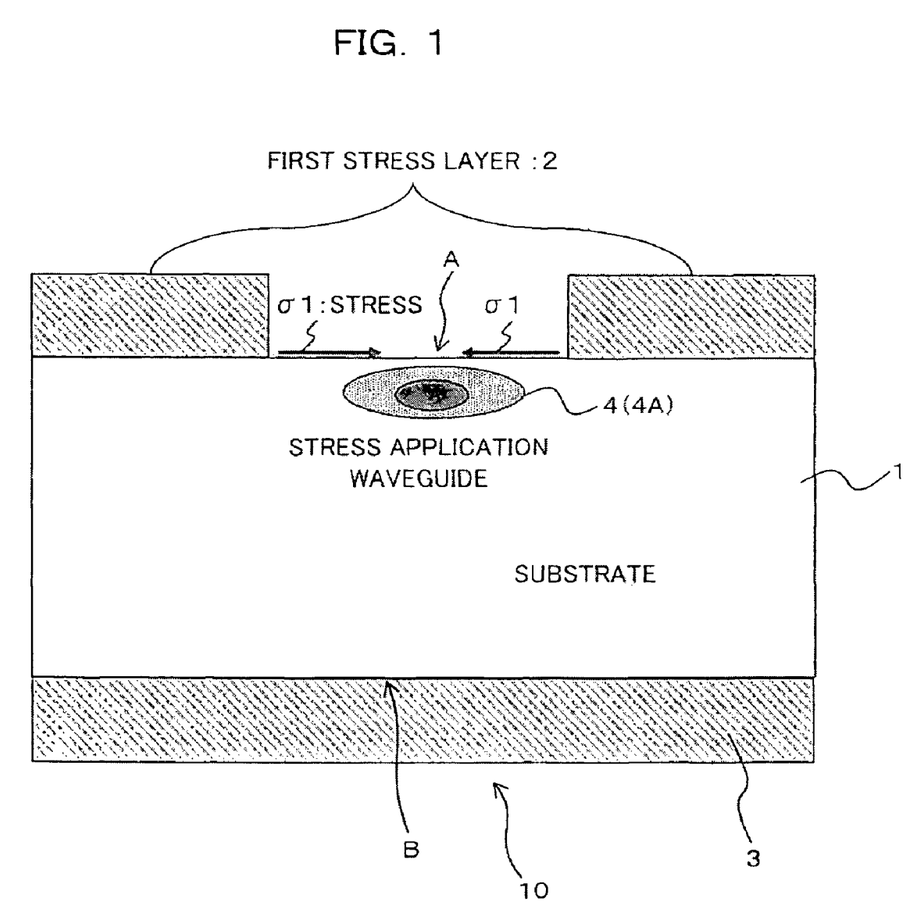
FIG. 1 is a schematic front elevational view showing an optical device according to an embodiment of the present application.

FIG. 1 is a schematic front elevational view showing an optical device 10 according to an embodiment of the present application. The optical device 10 shown in FIG. 1 includes a ferroelectric substrate 1 having a photoelastic effect, a first stress layer 2 formed on a first face (refer to reference character A in FIG. 1) of the substrate 1, and a second stress layer 3 formed on a second face (refer to reference character B in FIG. 1) which is the reverse face to the first face A of the substrate 1.

Here, similarly to the first stress layer 2 described above with reference to FIG. 9, the first stress layer 2 has a pattern for generating stress σ1 which induces refraction index variation by the photoelastic effect in a partial region 4 in the substrate 1. In particular, by the first stress layer 2 formed individually at left and right end portions on the first face A in FIG. 1, the stress σ1 is applied to the substrate region 4 at a portion sandwiched by the first stress layer 2 at the left and right end portions so that distortion is generated. Then, the region 4 in which the distortion is generated has, by induction of refraction index variation by the photoelastic effect, a refraction index higher than that of the other substrate region.

Consequently, if light is inputted to the region 4 having the high refraction index distribution, then the inputted light is confined and propagated in the region 4. Accordingly, in the optical device 10, the partial substrate region (partial region) 4 in which the distortion is generated by the stress σ1 applied from the first stress layer 2 can be configured as an optical waveguide 4A. In other words, a pattern of the optical waveguide 4A can be formed based on the substrate region sandwiched by the different portions of the first stress layer 2.

Further, different from the first stress layer 2, the second stress layer 3 formed on the second face B is formed uniformly on the second face B of the substrate 1 and generates stress for restoring the shape from the deformation caused by the stress generated in the substrate 1 by the first stress layer 2 in the substrate 1. In particular, the second stress layer 3 is configured such that stress having a directional property same as that generated in the substrate 1 by the first stress layer 2 is generated in the substrate 1. More particularly, where the first stress layer 2 is a tensile layer and generates tensile stress in the substrate 1, also the second stress layer 3 is configured as a tensile layer such that tensile stress is generated in the substrate 1, but, where the first stress layer 2 is a compressive layer and generates compressive stress in the substrate 1, also the second stress layer 3 is configured as a compressive layer and generates compressive stress in the substrate 1.

Therefore, by the stress generated 1 by the second stress layer 3, the substrate 1 distorted by the stress generated by the first stress layer 2 can restore the original state from a varied shape thereof. Consequently, in comparison with a case wherein only the first stress layer 2 is formed, the stress to be applied to the substrate region 4 which forms the optical waveguide 4A can be enhanced.

In particular, if distortion is generated in the substrate 1 by the first stress layer 2, then shape variation by flexure or the like occurs. By the shape variation, also the stress generated in the substrate 1 by the first stress layer 2 is decreased in comparison with that in a state wherein the shape variation does not occur. On the other hand, the second stress layer 3 is formed on the second face B so that the substrate 1 restores the original shape from the varied shape by the stress from the first stress layer 2. Consequently, since the stress having a magnitude, which the first stress layer 2 could originally apply unless the shape variation of the substrate 1 occurs, can be applied to the substrate 1, the stress to be applied to the substrate region 4 which forms the optical waveguide 4A can be enhanced.

Then, since, while the substrate 1 itself restores the original shape, the stress which the substrate region 4 receives is enhanced, also distortion appearing in the substrate 4 increases and also refraction index variation increases. Consequently, a confining effect of light upon light propagation along the optical waveguide 4A can be increased.

Figure 2A:
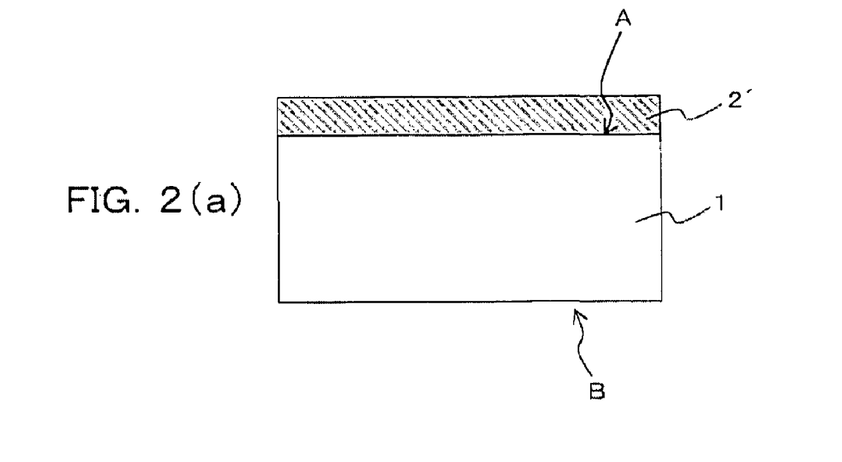
FIGS. 2(a) to 2(c) are views illustrating different steps in fabrication of the optical device according to the embodiment of the present application.
Figure 2B:
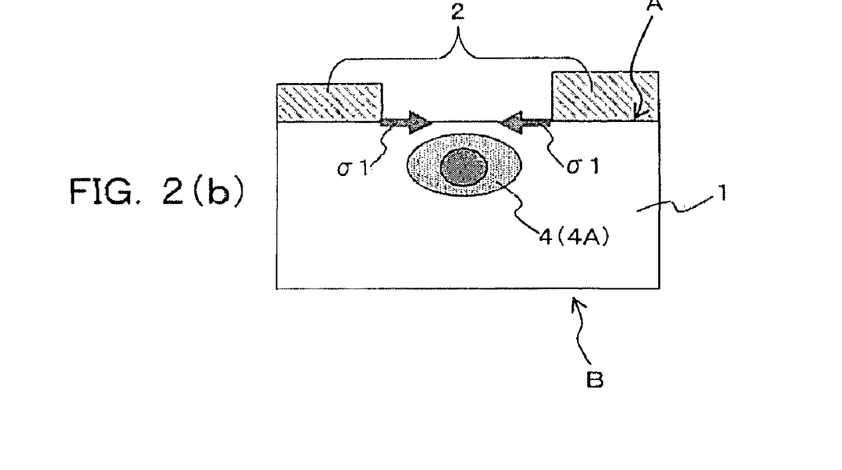
Figure 2C:
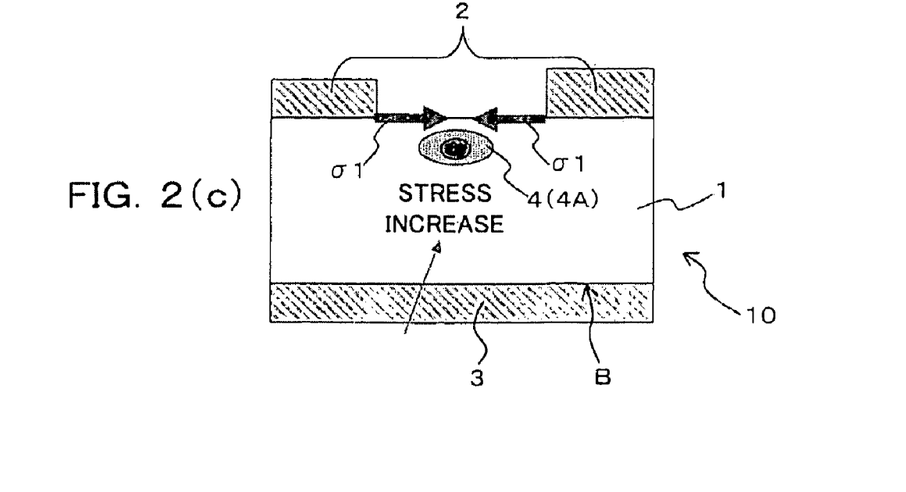

Here, the optical device 10 described above is fabricated by forming the first and second stress layers 2 and 3 on the substrate 1, for example, as shown in FIGS. 2(a) to 2(c).

First, as shown in FIG. 2(a), a uniform surface stress layer 2' is laminated on the first face A of the substrate 1 at a high temperature. Then, as shown in FIG. 2(b), the laminated surface stress layer 2' is removed by a process such as etching in accordance with the pattern of the optical waveguide 4A to be formed. Consequently, the first stress layer 2 is formed on the substrate 1 and the stress waveguide 4A is formed by the stress σ1 generated in the substrate 1 by the first stress layer 2 (from edge portions of the first stress layer 2). In FIG. 2(b), compressive force originating from the stress σ1 described above acts on the portion of the optical waveguide 4A.

Then, as shown in FIG. 2(c), the uniform second stress layer 3 is laminated, at a high temperature, on the second face B which is the reverse face to the first face A of the substrate 1. Here, the second stress layer 3 generates, in the substrate 1, the stress which acts to expand the second face B of the substrate 1 and compress the surface. Accordingly, while the stresses from the first and second layers 2 and 3 cancel each other at the portion of the first face A at which the first stress layer 2 is formed, the compressive force which the portion of the optical waveguide 4A, at which the first stress layer 2 is not formed, receives is enhanced. Therefore, the refraction index variation in the substrate region 4 can be increased.

Further, the first and second stress layers 2 and 3 are configured such that they generate stresses of the same direction determined by the polarity of the photoelastic coefficient which the substrate 1 itself has. Where the substrate 1 is formed from a material having a positive photoelastic coefficient value, in order to cause the first and second stress layers 2 and 3 to generate tensile stress in the substrate 1 as seen in FIGS. 1 and 2(c), a material whose thermal expansion coefficient value is lower than that of the substrate 1 is applied to the first and second stress layers 2 and 3.

Consequently, in a process of cooling from a high-temperature state upon lamination of the first and second stress layers 2 and 3 to a room-temperature state, self compressive force of the substrate 1 becomes higher than that of the first and second stress layers 2 and 3. Accordingly, the stress σ1 (as viewed from the first stress layer 2, stress in the substrate 1 by tensile force of the substrate 1: tensile stress) directed from portions of inside edges of the first stress layer 2 toward a portion corresponding to the portion at which the optical waveguide 4A is formed acts to generate distortion which causes refraction index variation in the optical waveguide 4A.

Here, the thermal expansion coefficient of the substrate 1 and the thermal expansion coefficient of the first stress layer 2 are represented by $\alpha_s$ and $\alpha_f$, respectively. The first stress layer 2 is formed on the substrate 1 at a temperature T (° C.) with a thickness t (μm). If the temperature returns to a room temperature (ordinary temperature) T0, then stress σth is generated in the substrate 1 by the thermal expansion coefficient difference. Here, σth is represented by an expression (2) given below.

$$\sigma_{th} = \frac{E_f \Delta T (\alpha_s - \alpha_f)}{1 - \nu_f} \quad (2)$$

where, $\Delta T=(T-T0)$, Ef represents the Young's modulus of the stress layer, and $\nu_f$ represents the Poisson's ratio of the stress layer. It is to be noted that values of Et and $\nu_f$ are determined from the material of the first stress layer 2. Further, generally the stress σ (stress σ1 in Figures) acting on a substrate when a thin film is formed as a stress layer is represented by σ=σint+σth. Here, σint is called true stress and is generated upon lamination independent of heat. Further, σth is stress generated by such a thermal expansion coefficient difference as described above.

Then, if the first stress layer 2 is patterned such that the formation region of the first stress layer 2 is divided as shown in FIG. 2(b), then distortion S is generated in a region sandwiched by the formation regions of the first stress layer 2, that is, in a region 3 in which the stress layer 2 is not formed. The relationship between the distortion S and the stress σ can be determined by solving an elastic equation from the elastic constant of the substrate. Here, when the stress σ is positive, the distortion S to be generated is negative, but, when the stress σ is negative, the distortion to be generated is positive.

Then, while, if the distortion S is applied to the substrate 1 having the photoelastic effect, then refraction index variation occurs, the refraction index variation Δn by the photoelastic effect is represented by an expression (3) given below:

$$\Delta n = -\frac{1}{2} n^3 p S \quad (3)$$

where, S represents the distortion to be applied to the substrate, and p a photoelastic coefficient. For example, if the substrate 1 is formed from a material having a positive photoelastic constant value, then a material having the thermal expansion coefficient value $\alpha_f$ lower than the thermal expansion coefficient value $\alpha_s$ of the substrate 1 is selected as a material for the first and second stress layers 2 and 3 ($\alpha_s > \alpha_f$) such that the tensile stress σ1 (stress having a positive value) is generated in the substrate 1 (refer to FIG. 1). Consequently, by setting the distortion S to be generated in the substrate region 4 so as to have a negative value, the refraction index in the expression (3) is increased (Δn becomes a positive value) and the optical waveguide 4 is formed.

On the other hand, if the substrate 1 is formed from a material having a negative photoelastic coefficient value (p<0), then a material having the thermal expansion coefficient value αf higher than the thermal expansion coefficient value αs of the substrate 1 is selected as a material for the first and second stress layers 2 and 3 (αs<αf) such that the compressive stress (stress having a negative sign) σ11 is generated in the substrate 1. Consequently, by setting the distortion S so as to have a positive value, the refraction index in the expression (3) is increased (Δn becomes a positive value) and the optical waveguide 4 is formed.

In this instance, in a process of cooling from a high-temperature state upon lamination of the first and second stress layers 2 and 3 to a room-temperature state, self compressive force for the first and second stress layers 2 and 3 becomes higher than that of the substrate 1. Accordingly, the stress σ11 (as viewed from the first stress layer 2, stress by compression of the substrate 1: compressive stress) from the portions of the inside edges of the first stress layer 2 in the substrate 1 toward an outer portion of the substrate 1 acts to generate distortion, which generates the refraction index variation in the substrate region 4.

Figure 3:
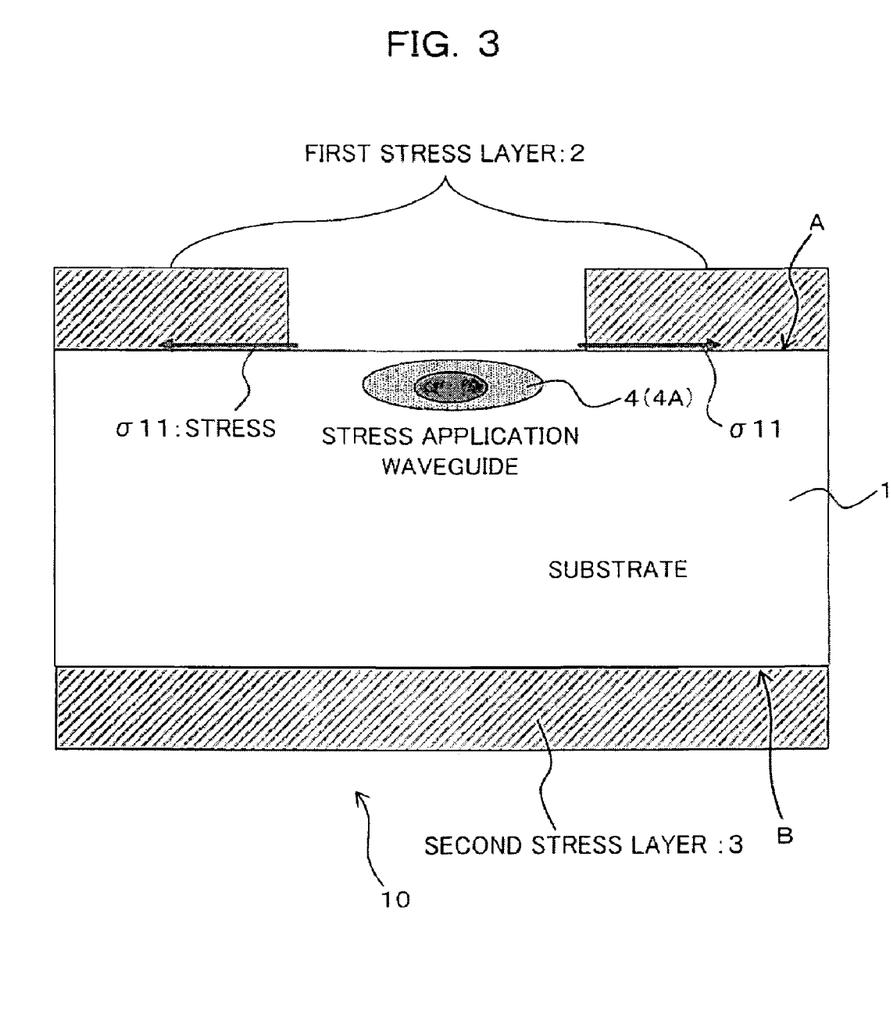
FIG. 3 is a schematic front elevational view showing an optical device according to a modification to the embodiment of the present application.

Further, in the case of FIG. 3, tensile force originating in the stress σ11 described hereinabove acts on the portion of the optical waveguide 4A. Then, also in this instance, while the second stress layer 3 causes the stresses to cancel each other at the portion of the first face A at which the first stress layer 2 is formed, the tensile force acting at the portion of the optical waveguide 4A at which the first stress layer 2 is not formed is enhanced. Therefore, the refraction index variation in the substrate region 4 can be increased.

Figure 4:
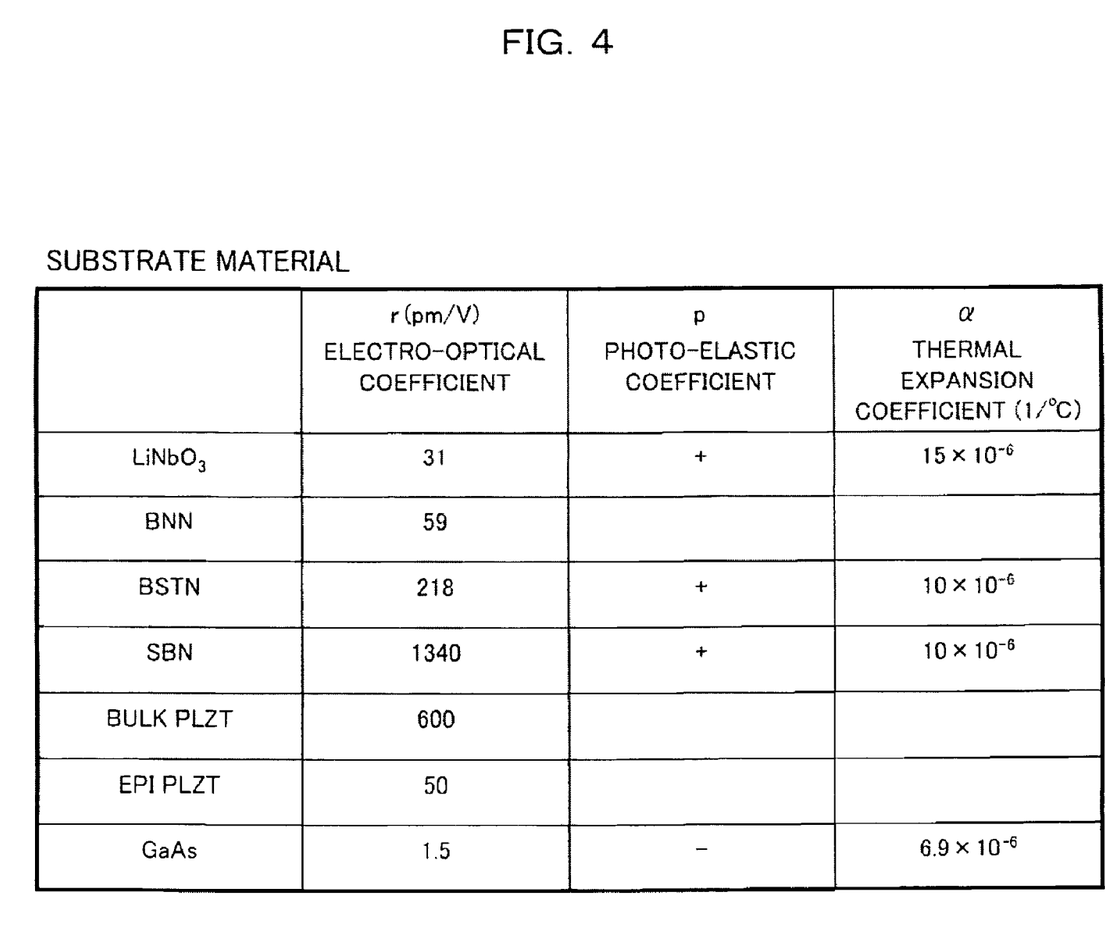
FIG. 4 is a view illustrating the electro-optical constant, photoelastic coefficient and thermal expansion coefficient of materials to be applied for a substrate.
Figure 5:
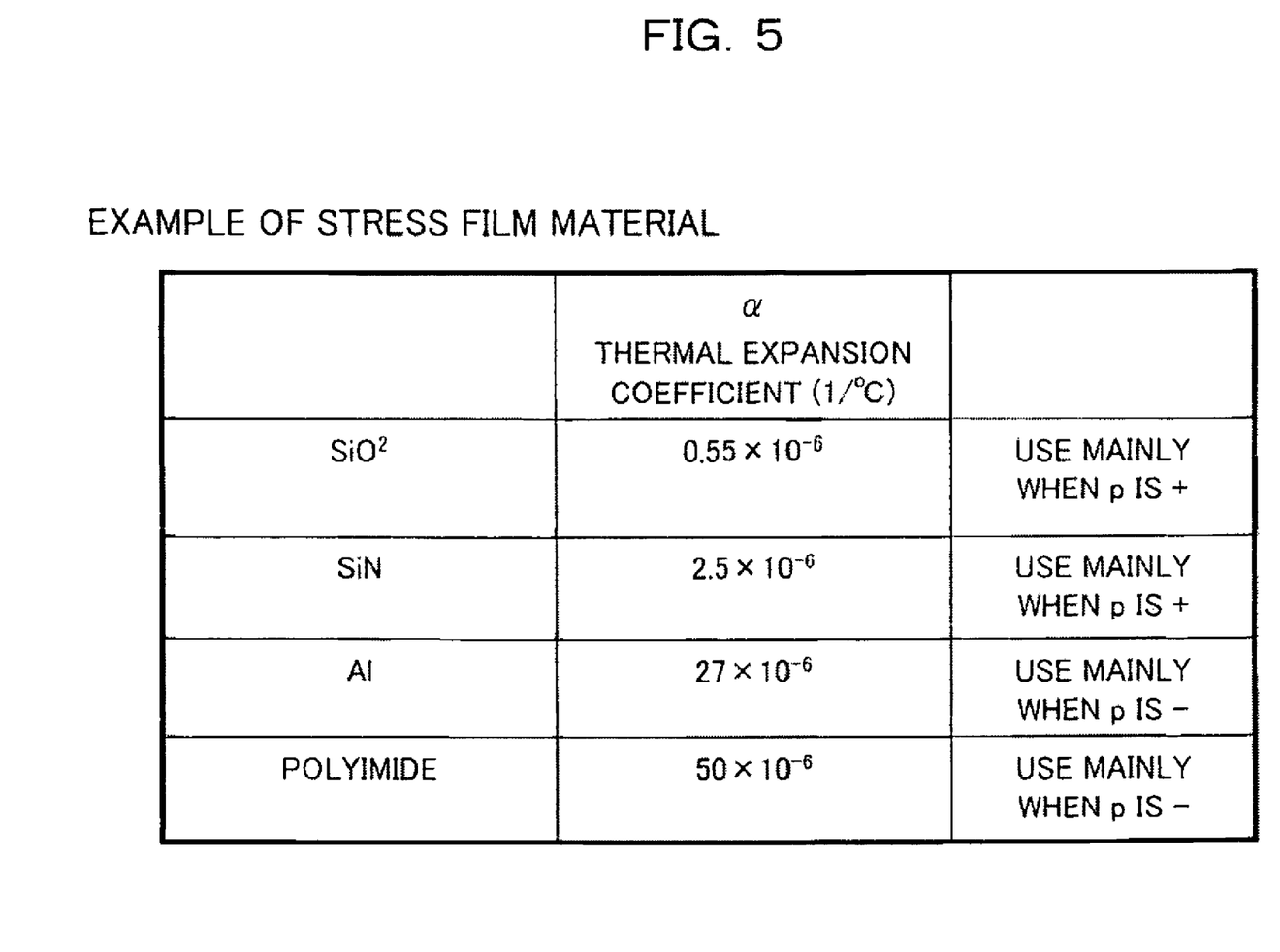
FIG. 5 is a view illustrating the thermal expansion coefficient value of materials to be applied as first and second stress layers.

FIG. 4 is a view illustrating a relationship among the electro-optical constant r (pm/V), photoelastic coefficient p and thermal expansion coefficient (1/° C.) of materials to be applied as the substrate 1. FIG. 5 is a view illustrating the thermal expansion coefficient value of materials to be applied as the first and second stress layers 2 and 3.

For example, where Z-cut LiNbO$_3$ is used for the substrate 1, as shown in FIG. 4, the thermal expansion coefficient α thereof is 15 ppm and the photoelastic coefficient thereof has the positive (plus) polarity. In the substrate 1 formed from a material having such characteristics as just described, for example, as shown in FIG. 5, a material such as SiO$_2$ or SiN having a thermal expansion coefficient (0.55 ppm and 2.5 ppm, respectively) lower than that of the substrate 1 is selected as a material for the first and second stress layers 2 and 3 such that the positive stress (tensile stress) σ1 is generated in the substrate 1 when the temperature state changes from a high-temperature state upon lamination to a room-temperature state (refer to FIG. 1).

Or, where GaAs is used for the substrate 1, as shown in FIG. 4, the thermal expansion coefficient α thereof is 6.9 ppm and the photoelastic coefficient thereof has the negative (minus) polarity. In the substrate 1 formed from a material having such a characteristic as just described, a material such as, for example, Al or polyimide having a thermal expansion coefficient (27 ppm and 50 ppm, respectively) higher than that of the substrate 1 is selected as the material for the first and second stress layers 2 and 3 such that the negative stress (compressive stress) σ11 is generated in the substrate 1 when the temperature state changes from a high-temperature state upon lamination to a room-temperature state.

In the optical device 10 configured in such a manner as described above, the first stress layer 2 is formed on the first face A of the substrate 1 and the second stress layer 3 having a characteristic of a linear expansion coefficient similar to that of the first stress layer 2 is formed uniformly on the second face B which is the reverse face to the first face A. Therefore, the stress (refer to σ1 in FIG. 1 or to σ11 in FIG. 3) to be generated in the substrate 1 by formation of the first stress layer 2 can be enhanced such that the refraction index variation in the substrate region 4 in the substrate 1 is increased, which region 4 is on the first face A side, on which the first stress layer 2 is not formed. Consequently, where light is inputted to the substrate region 4 as the optical waveguide 4A, the confining effect of propagation light can be enhanced.

Figure 6A:
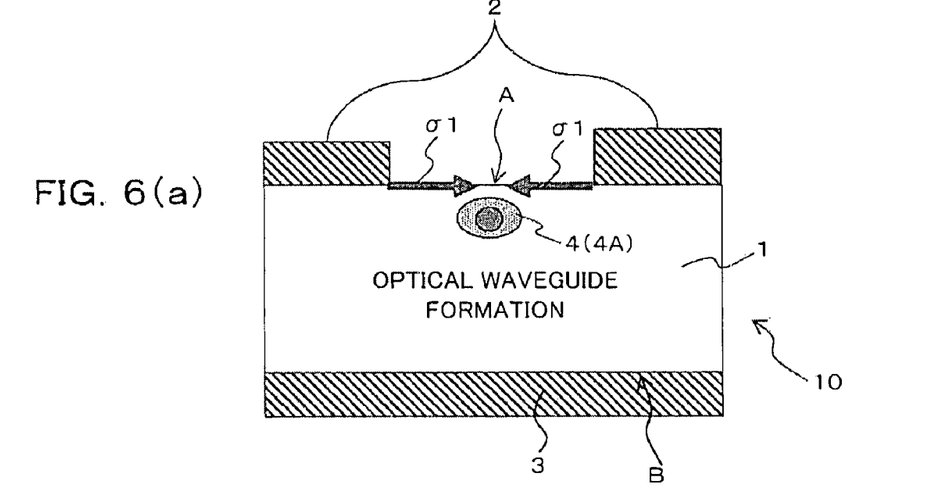
FIGS. 6(a) and (b) are views illustrating a working-effect of the present embodiment in comparison with the conventional technique.
Figure 7A:
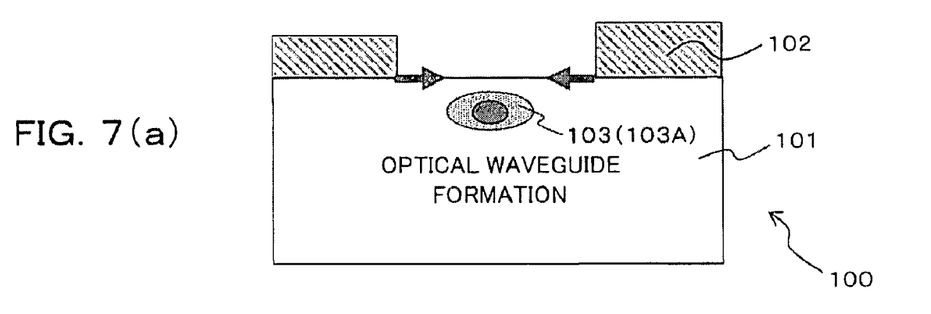
FIGS. 7(a) and (b) are views illustrating another working-effect of the present application compared with the conventional technique.

In order to verify the confining effect of light according to the present application, such an optical device 10 according to the present embodiment as shown in FIG. 6(a) was produced and such an optical device 100, wherein the second stress layer 3 was not formed as shown in FIG. 7(a), was produced. The optical devices 10 and 100 shown in FIGS. 6(a) and 7(a) have configurations similar to those in FIGS. 1 and 9, respectively, and like elements to those in FIGS. 1 and 9 are denoted by like reference characters.

Here, in the optical devices 10 and 100 shown in FIGS. 6(a) and 7(a), Z-cut LiNbO$_3$ having a thickness of 1 mm was used for the substrates 1 and 101 and a SiO$_2$ layer having a thickness of 5 μm was laminated under a condition of 300° C. as the stress layers 2 and 102. It is to be noted that, in both of the optical devices 10 and 100, the diameter of the opening between the patterns was set to 10 μm (in Figures, [μm] is represented as [um]).

Figure 6B:
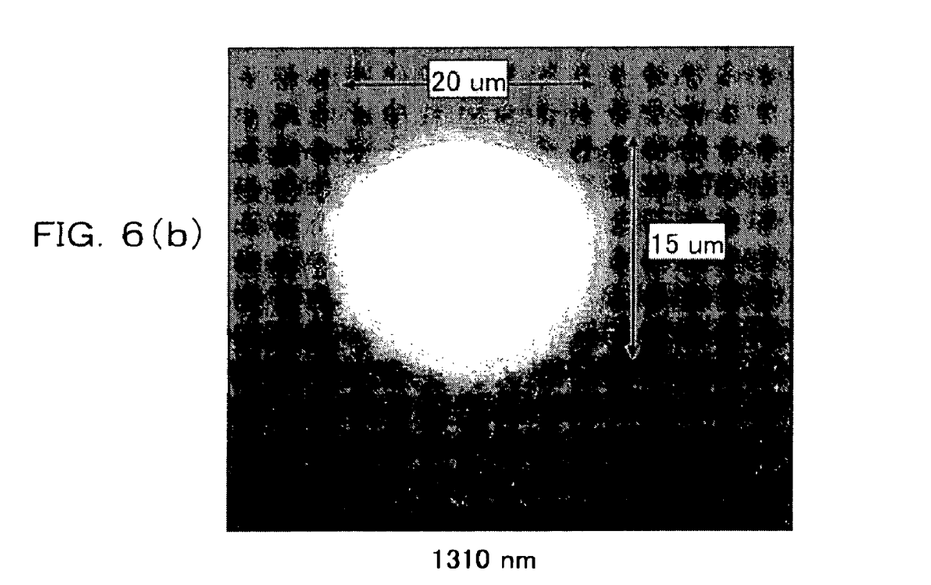
Figure 7B:
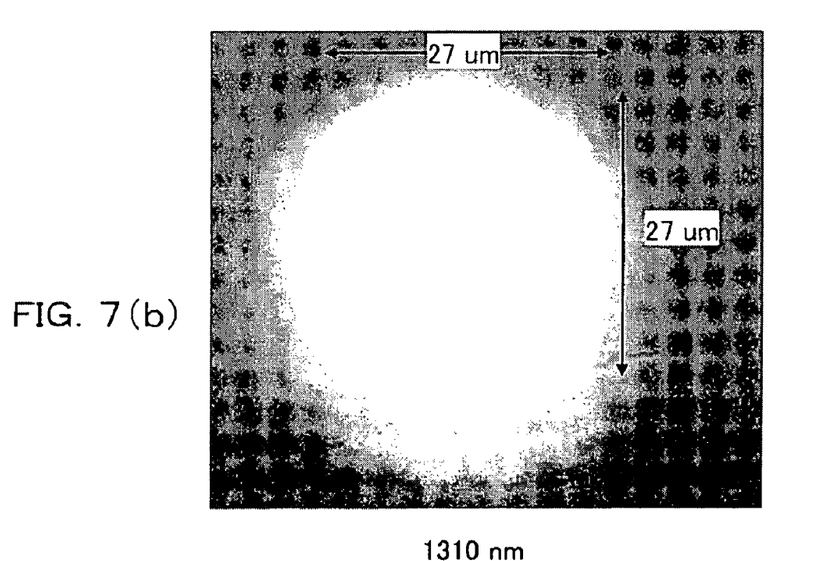

NFPs (near field patterns) of light where light having a wavelength of 1310 nm is propagated individually in the optical waveguides 4A and 103A in the optical devices 10 and 100 produced in such a manner as described above are shown in FIGS. 6(b) and 7(b), respectively. Here, in the optical device 100 according to the conventional technique shown in FIG. 7(a), the light spreads to a diameter of approximately 27 μm high×27 μm wide as seen in FIG. 7(b). However, in the optical device 10 according to the present embodiment shown in FIG. 6(a), the spread of the light is suppressed to a diameter of approximately 15 μm high×20 μm wide as seen in FIG. 6(b).

In particular, as seen in FIG. 6(a), it is recognized that, by forming the second stress layer 3, stress in the substrate region 4 is increased and the NFP of the light is decreased. If the stress is calculated backwardly from the diameter of the NFP, then it is recognized that, by application of the present application, the stress is enhanced by approximately 1.5 times. In particular, the loss is reduced to one half (3 dB down) in the coupling loss with an optical fiber of 10 μm. Since there is a photoelastic effect similar to that in the case just described also in a material having a high EO coefficient, an effect similar to that in the trial production at this time using LiNbO$_3$ can be obtained.

In this manner, with the optical device 10 according to the present embodiment, since the stress for restoring the shape from deformation caused by the stress generated in the substrate 1 by the first stress layer 2 is generated in the substrate 1 by the second stress layer 3 formed on the second face B which is the reverse face to the first face A of the substrate 1, there is an advantage that the stress (refer to σ1 in FIG. 1 or to σ11 in FIG. 3) to be generated in the substrate 1 and caused by formation of the first stress layer 2 can be enhanced and the refraction index variation in the substrate region 4 on the first face A side, on which the first stress layer 2 is not formed, in the substrate 1 can be increased. Further, also there is another advantage that, where light is inputted to the substrate region 4 as the optical waveguide 4A, the confining effect of the propagating light can be increased so that reduction of the loss is achieved.

Furthermore, with the present application, the low-loss optical waveguide can be formed also on a substrate of SBN or the like as shown in FIG. 8 described above formed from a material having a high electro-optical constant and power consumption as the optical device can be decreased significantly.

It is to be noted that, in the embodiment described above, also a further layer can be laminated on the first stress layer and/or the second stress layer.

[b] Others

The claimed invention is not limited to the embodiment specifically described above, and variations and modifications can be made without departing from the scope of the claimed invention.

Further, the apparatus of the claimed invention can be fabricated based on the disclosure of the embodiment described above.

What is claimed is:

1. An optical device, comprising:
    a substrate having a photoelastic effect;
    a first stress layer, formed on and contacting a first surface of said substrate, applying stress to said substrate so as to induce refraction index variation by the photoelastic effect in said substrate;
    an optical waveguide formed in said substrate due to the stress applied by said first stress layer; and
    a second stress layer, formed on and contacting a second surface of said substrate which is opposite to the first surface of said substrate, enhancing the stress to said substrate to induce the refraction index variation.

2. The optical device as claimed in claim 1, wherein, the induced refraction index variation causes the refraction index of said optical waveguide to higher than that in other regions in said substrate.

3. The optical device as claimed in claim 1, wherein said substrate is configured from a material whose photoelastic coefficient has a positive value, and
    said first and second stress layers are configured such that tensile stress is generated in said substrate.

4. The optical device as claimed in claim 3, wherein said first and second stress layers are configured from a material whose thermal expansion coefficient is lower than that of said substrate.

5. The optical device as claimed in claim 1, wherein said substrate is configured from a material whose photoelastic coefficient has a negative value, and said first and second stress layers are configured such that compressive stress is generated in said substrate.

6. The optical device as claimed in claim 5, wherein said first and second stress layers are configured from a material whose thermal expansion coefficient is higher than that of said substrate.

7. The optical device as claimed in claim 1, wherein said substrate is a ferroelectric substance having an electro-optical effect.

8. The optical device as claimed in claim 1, wherein a magnitude relationship between a thermal expansion coefficient of said first stress layer and a thermal expansion coefficient of said substrate and another magnitude relationship between a thermal expansion coefficient of said second stress layer and the thermal expansion coefficient of said substrate are the same magnitude relationship.

* * * * *

UNITED STATES PATENT AND TRADEMARK OFFICE
CERTIFICATE OF CORRECTION

PATENT NO.         : 7,729,568 B2
APPLICATION NO.   : 12/187606
DATED              : June 1, 2010
INVENTOR(S)        : Takashi Shiraishi et al.

It is certified that error appears in the above-identified patent and that said Letters Patent is hereby corrected as shown below:

Column 10, Line 3 delete "to higher" and insert --to be higher--.

Signed and Sealed this

Second Day of November, 2010

David J. Kappos
*Director of the United States Patent and Trademark Office*